(12) United States Patent
Yamada

(10) Patent No.: US 6,742,113 B1
(45) Date of Patent: May 25, 2004

(54) MICROPROCESSOR WITH EIT, PROCESSING CAPABILITY, AND EIT PROCESSING METHOD

(75) Inventor: Akira Yamada, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 09/440,699

(22) Filed: Nov. 16, 1999

(30) Foreign Application Priority Data

May 31, 1999 (JP) ............................................ 11-151843

(51) Int. Cl.$^7$ ......................... B06F 12/06; B06F 11/36; B06F 9/48
(52) U.S. Cl. ..................... 712/244; 712/227; 711/220; 714/34
(58) Field of Search .......................... 711/220; 712/227, 712/244; 714/34

(56) References Cited

U.S. PATENT DOCUMENTS

| | | | |
|---|---|---|---|
| 6,075,941 A | * 6/2000 | Itoh et al. | 714/38 |
| 6,304,950 B1 | * 10/2001 | Inoue et al. | 711/170 |
| 6,401,197 B1 | * 6/2002 | Kondo | 713/1 |
| 6,425,039 B2 | * 7/2002 | Yoshioka et al. | 712/244 |

FOREIGN PATENT DOCUMENTS

| | | |
|---|---|---|
| JP | 62-282335 | 12/1987 |
| JP | 1-219930 | 9/1989 |
| JP | 5-27989 | 2/1993 |
| JP | 6-103115 | 4/1994 |
| JP | 6-124212 | 5/1994 |
| JP | 6-324884 | 11/1994 |
| JP | 7-262023 | 10/1995 |

* cited by examiner

Primary Examiner—William M. Treat
(74) Attorney, Agent, or Firm—McDermott, Will & Emery

(57) ABSTRACT

A microprocessor connected to external memory storing a reset process program and an exception, interrupt, or trap (EIT) processing program, has an internal memory for storing an application program; copies one or more EIT process programs to empty space in the internal memory when the reset process program is executed; determines whether an initiated EIT process is a reset process or EIT process for program debugging; and changes the destination address of program branches to the internal memory when an initiated EIT process is not a reset process or program debugging EIT process, and changes the destination address of program branches to external memory when an initiated EIT process is a reset process or program debugging EIT process.

3 Claims, 8 Drawing Sheets

MICROPROCESSOR WITH EIT, PROCESSING CAPABILITY, AND EIT PROCESSING METHOD

BACKGROUND OF THE INVENTION

1. Field of the Invention

The present invention relates to a microprocessor having an error, interrupt, and trap processing function for handling reset, exception, interrupt, and trap processes occurring during program execution, and relates further to an error, interrupt, and trap processing method.

2. Description of Related Art

When a microprocessor is initialized or reset, an initialization program stored in an internal or external memory is run to initialize internal chip states. After running the initialization program, the microprocessor runs a user application program stored in an external memory.

Exception, interrupt, and trap processes (referred to below as EIT processes) are typical of processes that interrupt and change the execution sequence of a user application. An exception process is performed, for example, when an instruction code other than one of the reserved instruction codes is decoded, or when the program attempts to access an memory area that is prohibited to access. Interrupt processes include the above-noted reset process, interrupts asserted from an external device, and interrupts used for debugging. Trap processes test particular conditions so that a corresponding routine can be executed, such as an EIT process executed by an instruction in the program, and include normal error traps and debugging traps.

One method for performing an EIT process is to branch the program sequence directly to a fixed EIT vector area stored in an external memory. The EIT vector area is normally located at a fixed address in the external memory, and the application program developer cannot change the storage address of the EIT vector area.

The operating speed of external memory is also typically lower than the internal operating speed of the microprocessor, and accessing an EIT vector area in the external memory for every EIT process is a factor lowering the processing capacity (throughput) of the microprocessor.

Japanese Unexamined Patent Laid-Open Publications SHO62-282335, HEI1-219930, HEI6-124212, HEI6-324884, and HEI7-262023 teach various methods for increasing the degree of freedom of program design and increasing the speed of EIT processes. These methods typically enable the EIT vector area storage address to be changed by copying the EIT process program to the microprocessors internal RAM and using registers to store the addresses to which an EIT process branches the program sequence. EIT process speed can thus be improved by designing all EIT processes other than reset processes to branch the control sequence to address internal RAM.

Japanese Unexamined Patent Laid-Open Publications SHO62-282335 and HEI5-27989 also teach various microprocessors for achieving high speed EIT processing by reserving two EIT vector areas in a memory and switching between these two EIT vector areas when, for example, a same EIT process occurs repeatedly and consecutively.

While not directly related to accelerating microprocessor processing capacity, debugging is an EIT process that is essential to software program development. Japanese Unexamined Patent Laid-Open Publication HEI6-103115 teaches a debugging method for effectively accomplishing this debugging process by starting a pseudointerrupt process without starting a debugging program using a dedicated debugging data table.

As noted above, EIT processes include processes related to the debugging operations required during program development. Therefore, if all branch addresses used by the EIT process can be freely moved as with the above-noted conventional microprocessor, EIT vector addresses for debugging-related EIT processes that should not be changed by the user could be changed. In this case, the program development environment could be crashed.

SUMMARY OF THE INVENTION

It is therefore an object of the present invention to provide a microprocessor for achieving high speed EIT processes while also appropriately protecting the user programming environment.

To achieve the above object, a microprocessor according to a first aspect of the present invention has an exception, interrupt, and trap (EIT) processing function for branching a program processing sequence to an EIT vector area and executing an EIT process program when an EIT process is initiated. This microprocessor is connected to an external memory having an EIT vector area containing data for various EIT process programs, including an EIT process program related to program development. Further specifically, this microprocessor comprises an internal memory for storing data identical to the data in the EIT vector area of the external memory; a first determining circuit for determining whether an EIT process initiated during process sequence execution is an EIT process required for program development; and a branch destination changing circuit for setting a process sequence branch destination to the EIT vector area stored in the external memory when the first determining circuit determines the initiated EIT process to be the EIT process required for program development, and setting the process sequence branch destination to the EIT vector area stored in the internal memory when the first determining circuit determines the initiated EIT process to not be the EIT process required for program development.

A microprocessor thus comprised can prevent a user from inadvertently crashing the program development environment by fixing sequence branch destination addresses to the external memory when an EIT process required for program development is executed. Fast EIT processing can also be achieved when the EIT process required for program development is executed by setting sequence branch destination addresses to the internal memory.

Preferably, the EIT process program required for program development and stored to the EIT vector area in the external memory may include debugging related EIT process program data.

According to another aspect of the present invention, there is provided a microprocessor.

Also preferably, where the EIT vector of the external memory includes a reset process program, the determining determines the initiated EIT process is a reset process the branch destination changer setting the process sequence branch destination to the EIT vector area stored in the external memory.

According to another aspect of the present invention, there is provided a microprocessor having an exception, interrupt, and trap (EIT) processing function for branching a program processing sequence to an EIT vector area for executing an EIT process program when an EIT process is initiated. The microprocessor is connected to an external memory having an EIT vector area containing programs for a plurality of EIT processes and comprises an internal memory for storing first data in a first area of the internal memory and second data in a second area of the internal memory, said first data being identical to data in a first portion of the EIT vector area of the external memory while said second data is identical to data in a second portion of the EIT vector area of the external memory.

This microprocessor also comprises a determining circuit for determining whether an EIT process initiated during process sequence execution is a first EIT process, a second EIT process or a third EIT process among the plurality of EIT processes, and a branch designation changer. The branch designation changer sets a process sequence branch designation to the EIT vector area stored in the external memory when the determining circuit determines the initiated EIT process to be the first EIT process; the process sequence branch designation to the first area of the internal memory when the determining circuit determines the initiated EIT process to be the second EIT process; and the process sequence branch designation to the second area of the internal memory when the determining circuit determines the initiated EIT process to be the third EIT process.

The microprocessor thus comprised fixes branch sequence addresses to the external memory during reset process execution, changes the branch address to a first EIT vector area copied to the internal memory when an EIT process required for program development is executed, and changes the branch address to a second EIT vector area copied to the internal memory when an EIT process other than a reset process or an EIT process required for program development is executed.

It is to be noted that EIT process programs required for program development and stored to the EIT vector area in the external memory may include data for debugging related EIT processes, and such debugging related EIT processes are handled as EIT processes for program development. By fixing sequence branch addresses to the external memory when reset processes and debugging related EIT processes are executed, inadvertent crashing of the program development environment by a user can be effectively prevented. High speed EIT process execution can also be achieved when EIT processes other than reset processes and debugging related EIT processes are executed by changing sequence branch addresses to the internal memory.

The present invention furthermore provides an exception, interrupt, and trap (EIT) processing method used by a microprocessor for branching a program processing sequence to an EIT vector area for executing an EIT process program when an EIT process is initiated. This microprocessor is connected to an external memory having an EIT vector area containing data for various EIT process programs, including an EIT process program related to program development. This EIT processing method more specifically comprises storing data identical to the data in the EIT vector area of the external memory to the internal memory of the microprocessor; determining whether an EIT process initiated during process sequence execution is an EIT process required for program development; and setting the process sequence branch designation to the EIT vector area stored in the external memory when determined the initiated EIT process to be the EIT process required for program development. This setting step sets the process sequence branch destination to the EIT vector area stored in external memory when determined the initiated EIT process to not be the EIT process required for program development.

An EIT processing method thus comprised can prevent a user from inadvertently crashing the program development environment by fixing sequence branch destination addresses to the external memory when the EIT process required for program development is executed. Fast EIT processing can also be achieved when an EIT process other than the EIT process required for program development is executed by setting sequence branch destination addresses to internal memory.

The present invention also provides an exception, interruption, and trap (EIT) processing method used by a microprocessor with an internal memory for branching a program processing sequence to an EIT vector area for executing an EIT process program when an EIT process is initiated. This microprocessor is connected to an external memory having an EIT vector area containing programs for a plurality of EIT processes. This method comprises storing data identical to data in a first portion of the EIT vector area of the external memory in a first area of the internal memory and second data identical to data in a second portion of the EIT vector area of the external memory; determining whether an EIT process initiated during process sequence execution is a first EIT process, second EIT process or third EIT process among the plurality of EIT processes; and setting a process sequence branch designation to the EIT vector area of the external memory when the initiated EIT process is the first EIT process, to the first area of the internal memory when the initiated EIT process is the second EIT process, and, to the second area of the internal memory when the initiated EIT process is the third EIT process.

Other objects and attainments together with a fuller understanding of the invention will become apparent and appreciated by referring to the following description and claims taken in conjunction with the accompanying drawings.

DESCRIPTION OF THE PREFERRED EMBODIMENTS

The preferred embodiments of the present invention are described below with reference to the accompanying figures.

Embodiment 1

Figure 1:
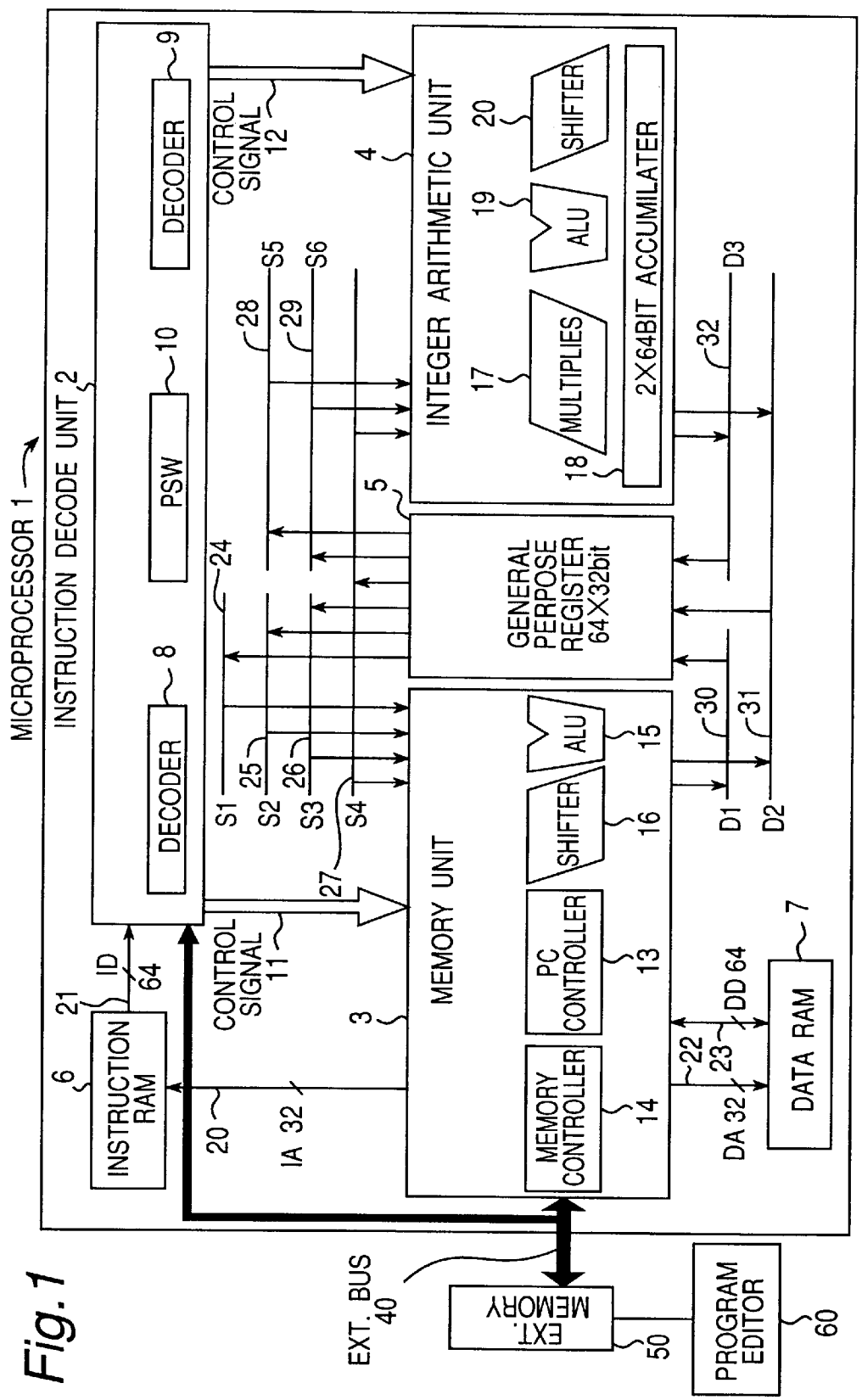
FIG. 1 is a typical block diagram of a microprocessor according to a first embodiment of the present invention.

FIG. 1 is a block diagram of a microprocessor 1 according to a first preferred embodiment of the present invention.

Also shown in FIG. 1 are external memory 50 and an editor 60 for modifying a program stored to external memory 50.

An initialization program that is executed when the microprocessor 1 is booted up or reset, an application program that runs after the initialization program, and various EIT process programs, are stored to external memory 50. The program editor 60 typically comprises a display for presenting to the user the program stored to external memory 50, and a keyboard for writing and editing the program, as a basic man-machine interface for programming. A user can thus create and edit an initialization program and/or application program stored to external memory 50 using the keyboard.

During startup and reset operations, the microprocessor 1 copies the various EIT process programs stored in external memory 50 to internal instruction RAM 6. For EIT processes required for program development and microprocessor resetting, the microprocessor 1 fixes sequence branch addresses to the EIT vector area of the external memory 50. For traps and EIT processes other than those required for program development, the microprocessor 1 copies the sequence branch addresses to the EIT vector area copied to the internal instruction RAM 6.

As noted above, a microprocessor 1 according to this preferred embodiment of the invention fixes the memory addressed by any EIT process required for program development to the EIT vector area of the external memory 50, thereby preventing debugging from being disabled or the programming environment from otherwise crashing. It is to be noted that EIT processes required for program development include debugger interrupts and other processes whereby an end-user could inadvertently change the memory area addressed by a branch in the program sequence. In addition, EIT processes that have no affect on the programming environment are able to branch to an EIT vector area copied to the internal instruction RAM 6, thereby enabling the microprocessor 1 to quickly execute EIT processes that have no affect on the programming environment and thus could not cause the programming environment to crash.

Various function blocks of the microprocessor 1 shown in FIG. 1 are described next below.

Microprocessor 1 in this exemplary embodiment is a 32-bit microprocessor with a 32-bit wide internal data bus. Instruction RAM 6 outputs an instruction code stored to the address specified by 32-bit address data input from memory unit 3, which is further described below, via 32-bit wide IA bus 20 to 64-bit wide ID bus 21.

Instruction decoding unit 2 decodes instruction codes input from instruction RAM 6 via ID bus 21 to generate control signal 11 and control signal 12. The instruction decoding unit 2 then outputs control signal 11 to memory unit 3, and outputs control signal 12 to an integer arithmetic unit 4.

The memory unit 3 executes an instruction specified by the control signal 11, stores the result to general purpose register 5, and then calculates the address of the next instruction code to be run and passes this address to the IA bus 20.

The instruction execution type integer arithmetic unit 4 performs logic and shift operations according to control signal 12.

The general purpose register 5 comprises 64 32-bit registers in this exemplary embodiment. Data RAM 7 is used for working memory during instruction execution.

The internal structure of the above-noted function blocks is described next below.

The instruction decoding unit 2 has decoders 8 and 9 for decoding the 64-bit instruction codes input thereto from instruction RAM 6. PSW register 10 is a register for storing a processor status word indicative of microprocessor 1 status, and is updated based on the content and execution results of instructions decoded by the decoders 8 and 9.

The instruction decoding unit 2 generates a control signal 11 based on the result of decoding by decoder 8 and the content of PSW register 10, and passes the resulting control signal 11 to memory unit 3. In addition to parameters, variables, and other data signals required for instruction execution, this control signal 11 contains an EIT signal indicative of whether the instruction content is an EIT process, an EIT type signal indicative of the EIT process type, a vector base register enable signal indicative of whether the vector base register is enabled, and an instruction type signal indicative of the type of instructions for other than EIT processes.

The EIT signal in the control signal 11 is one bit, which in this exemplary embodiment is set to 1 if the instruction references an EIT process, and is otherwise set to 0.

The EIT type signal is 8 bits, and is set according to the type of EIT process.

The vector base register enable signal is also 1 bit. If the EIT process is a trap 0 to 31 or EI (exception interrupt) that is not required for program development, the vector base register enable signal is set to 1. If the EIT process is a RI (reset interrupt) or DBT, DDBT, or DBI required for program development, the vector base register enable signal is set to 0.

The instruction type signal is 16 bits, and is set according to the type of instruction.

The instruction decoding unit 2 similarly generates control signal 12 according to the result of decoding by decoder 9 and the content of the PSW register 10, and passes the resulting control signal 12 to the integer arithmetic unit 4.

When an instruction not containing any jumps or branches is executed, PC controller 13 in the memory unit 3 adds one byte to the address set for instruction execution and passes the resulting sum as the address where the next instruction to be executed is stored. When an executed instruction contains a branch, the PC controller 13 adds the branch displacement to the address set for instruction execution, and passes the resulting address value as the address where the next instruction to be executed is stored. When a jump instruction is executed, the PC controller 13 calculates the address at which the instruction that is jumped to is stored by using an operation determined by the addressing mode specified by the operation, and then outputs the resulting address data.

Memory controller 14 outputs the address data calculated by the PC controller 13 to instruction RAM 6 by way of 32-bit wide IA bus 20. The memory controller 14 also sends the address data by way of 32-bit wide DA bus 22 to data RAM 7, and receives data required for instruction execution via 64-bit wide DD bus 23. ALU 15 performs arithmetic logic operations as instructed on up to three words of data received from the general purpose register 5 via 32-bit wide S1 bus 24, S2 bus 25, and S3 bus 26, and sends the result back to the general purpose register 5 via D1 bus 30.

The general purpose register 5 can read six different register values at once via S1 bus 24, S2 bus 25, S3 bus 26, S4 bus 27, S5 bus 28, and S6 bus 29. It can also write up to three register values simultaneously via D1 bus 30, D2 bus 31, and D3 bus 32.

The general purpose register 5 can simultaneously send four 32-bit data words to the memory unit 3 via S1 bus 24, S2 bus 25, S3 bus 26, and S4 bus 27. This makes it possible for the memory unit 3 to achieve a two word storage instruction whereby, for example, the content of a third register (not shown in the figures) in the general purpose register 5 sent to the memory unit 3 via S3 bus 26 is stored to an area in data RAM 7 addressed by the sum of the content of a first register (not shown in the figures) in the general purpose register 5 sent via S1 bus 24 and the content of a second register (not shown in the figures) in the general purpose register 5 sent via the S2 bus 25. In addition, the content of a fourth register (not shown in the figures) in the general purpose register 5 sent to the memory unit 3 via S4 bus 27 is stored to an area in data RAM 7 addressed by adding a specific value to the address at which is stored the content of the above-noted third register. Using D1 bus 30 and D2 bus 31, each 32 bits wide, the memory unit 3 can also send a 2-word operation result from memory unit 3, or two data words received from the data RAM 7, to the general purpose register 5.

A multiplier 17 in the integer arithmetic unit 4 multiplies a maximum three words of data sent from the general purpose register 5 via 32-bit wide S4 bus 27, S5 bus 28, and S6 bus 29, and sends the result back to the general purpose register 5 via 32-bit wide D2 bus 31 and D3 bus 32.

An accumulator 18 comprises two 64-bit accumulators, and stores the product obtained by multiplier 17 as either a cumulative sum or cumulative difference depending upon the instruction type.

The ALU 19 of the integer arithmetic unit 4 performs an arithmetic and logic operation on a maximum three data words sent from general purpose register 5 via S4 bus 27, S5 bus 28, and S6 bus 29, and sends the result back to the general purpose register 5 via D2 bus 31 and D3 bus 32.

Shifter 20 in the integer arithmetic unit 4 shifts data sent from general purpose register 5 via S4 bus 27, S5 bus 28, and S6 bus 29, and likewise returns the shift result to the general purpose register 5 via D2 bus 31 and D3 bus 32.

Application programs stored in instruction RAM 6, for example, are executed by a microprocessor 1 comprised as described above by looping through the following three basic steps. That is:

Step 1: instruction RAM 6 outputs an instruction code stored at an address specified by the memory unit 3;

Step 2: instruction decoding unit 2 decodes the instruction code output from instruction RAM 6 to generate control signals 11 and 12, and then passes control signals 11 and 12 to memory unit 3 and integer arithmetic unit 4;

Step 3: memory unit 3 executes an instruction and stores the result based on control signal 11, and determines the address at which the next instruction to execute is stored, and the integer arithmetic unit 4 performs the operation indicated by control signal 12.

It is to be noted that EIT process programs stored to the EIT vector area of external memory 50, and EIT process programs stored to the EIT vector area copied to instruction RAM 6 as further described below, are executed with the same procedure.

When the microprocessor 1 is activated or reset, the memory unit 3 runs an initialization program stored in the external memory 50 via external bus 40. The application program and EIT vector area are also copied to a specific address in instruction RAM 6 when the initialization program is run.

Figure 2:
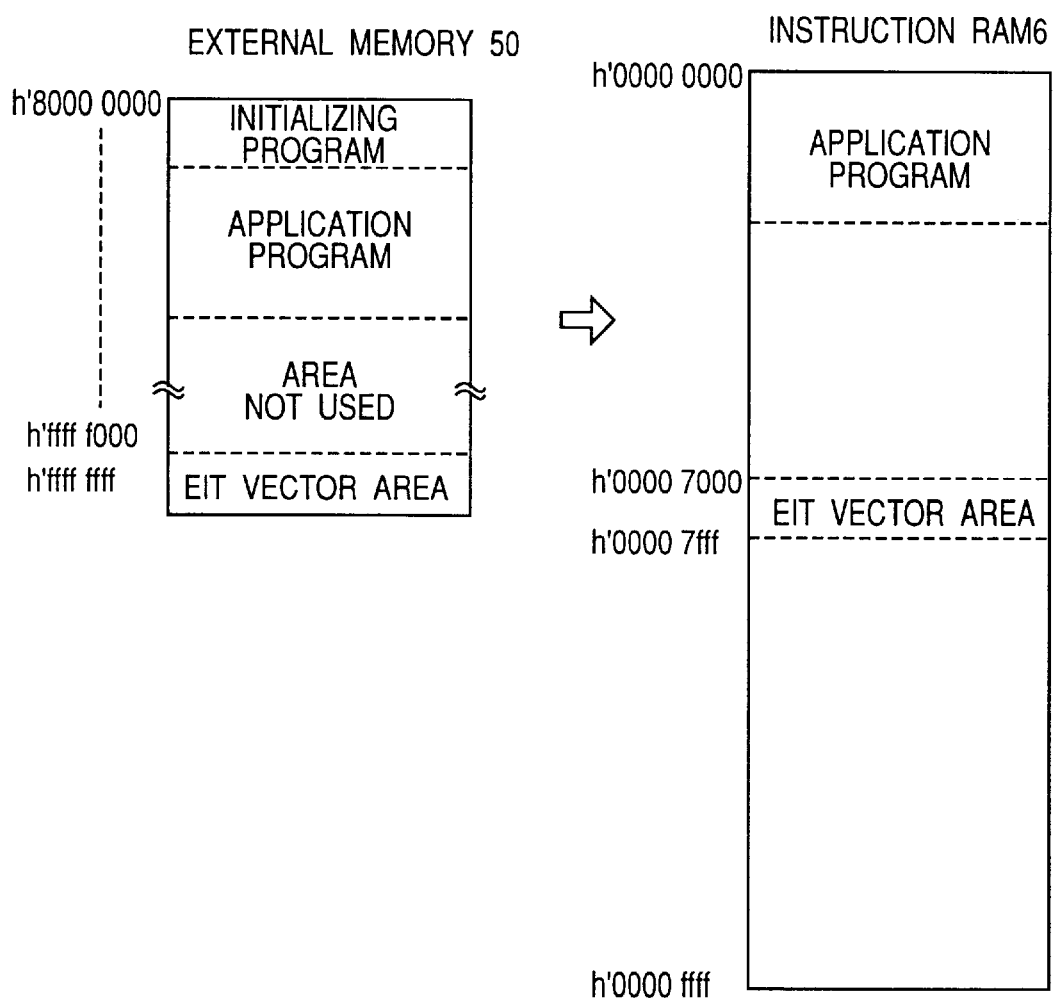
FIG. 2 is a memory map of instruction RAM and external memory after an initialization process has ended.

FIG. 2 is a memory map of the external memory 50, and of instruction RAM 6 after the initialization program is run.

As shown in FIG. 2, instruction RAM 6 has an address space from 0000 0000h to 0000ffffh where "h" indicates hexadecimal notation. The external memory 50 likewise has an address space from 8000 0000h to ffff ffffh.

The initialization program and application program are stored in external memory 50 from address 8000 0000h. Addresses ffff 0000h to ffff ffffh in external memory 50 are allocated to the EIT vector area to which various EIT process programs are stored in sequence as further described below with reference to FIG. 3.

When the initialization program is run the application program is also copied to instruction RAM 6 starting from address 0000 0000h, and data in the EIT vector area is copied to empty memory area from address 0000 7000h.

The following Table 1 shows the first address of each EIT process program stored to the EIT vector area of external memory 50, and the first address of each EIT process program copied to instruction RAM 6.

TABLE 1

| EIT type | external memory address | instruction RAM address |
|---|---|---|
| RI | ffff f000 | 0000 7000 |
| TRAP 0 | ffff f020 | 0000 7020 |
| TRAP 1 | ffff f028 | 0000 7028 |
| ... | | |
| TRAP 31 | ffff f118 | 0000 7118 |
| DBT | ffff f120 | 0000 7120 |
| DDBT | ffff f128 | 0000 7128 |
| DBI | ffff f130 | 0000 7130 |
| EI | ffff f138 | 0000 7138 |

Note that in the above table RI is an abbreviation for reset interrupt and indicates a reset process; TRAP 0 to TRAP 31 indicate various trap processes; DBT is a debug trap; DDBT is a debugger debug trap; DBI is a debug interrupt; and EI is an abbreviation for an external interrupt, indicating an external interrupt process. Note that the above abbreviations are used below for the various EIT processes.

Figure 3:
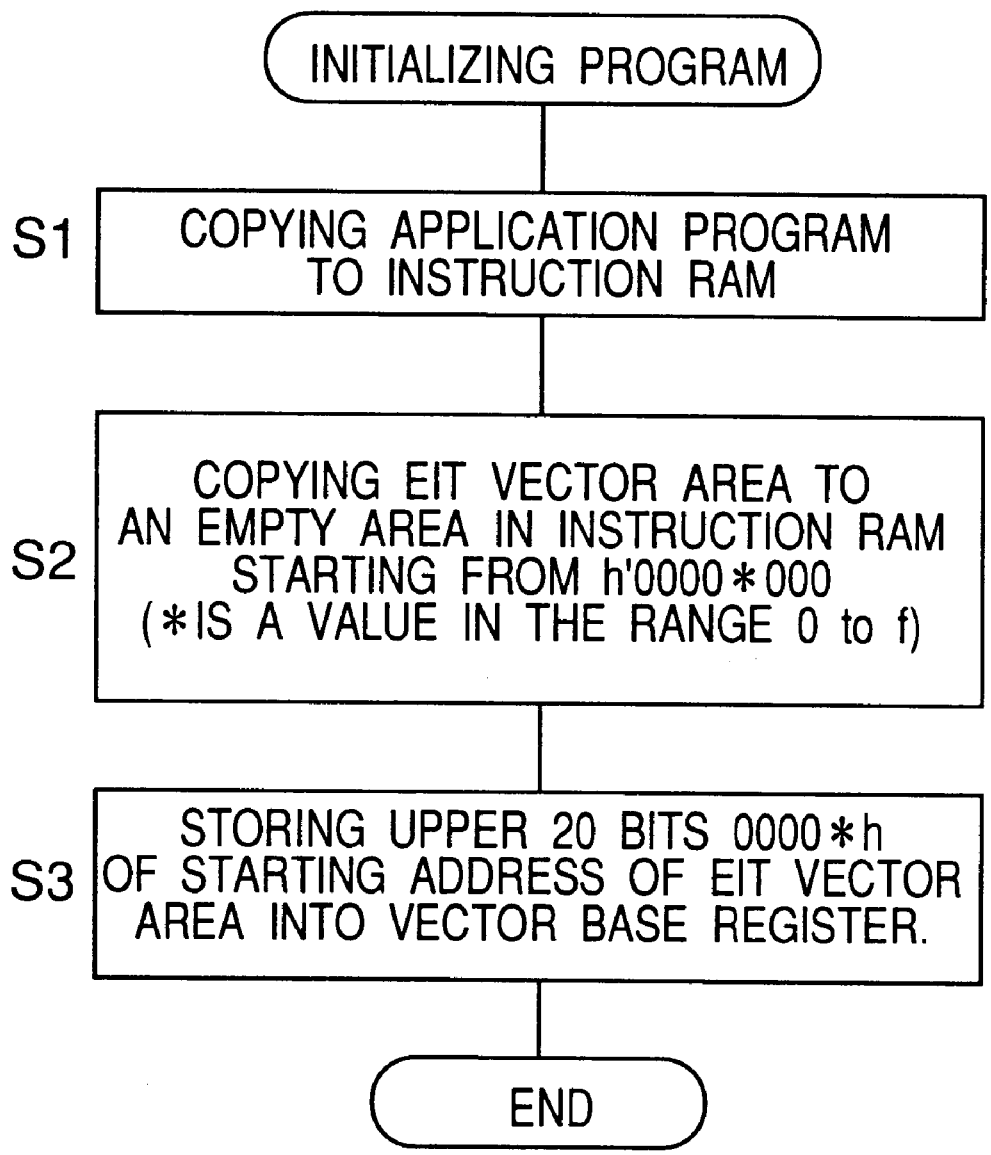
FIG. 3 is a flow chart of a process executed by an initialization program of the microprocessor shown in FIG. 1.

FIG. 3 is a flow chart showing the content of the initialization program processes. At step S1, the application program stored in external memory 50 is copied to instruction RAM 6 starting from address 0000 0000h. Next, the EIT vector area is copied to an empty area in instruction RAM 6 starting from address 0000 *000h where "*" is a value in the range 0 to f (hexadecimal) (step S2). In the example shown in FIG. 2, the value of * is 7. It is to be noted that insofar as the addressed area in instruction RAM 6 is empty, the value of * can be set by the user within the initialization program anywhere in the range 0 to f (hex). The upper 20 bits 0000*h of the starting address **0000 *000**h in the EIT vector area written to instruction RAM 6 are then stored to vector base register 303 (see FIG. 4) (step 3), and the process ends.

Figure 4:
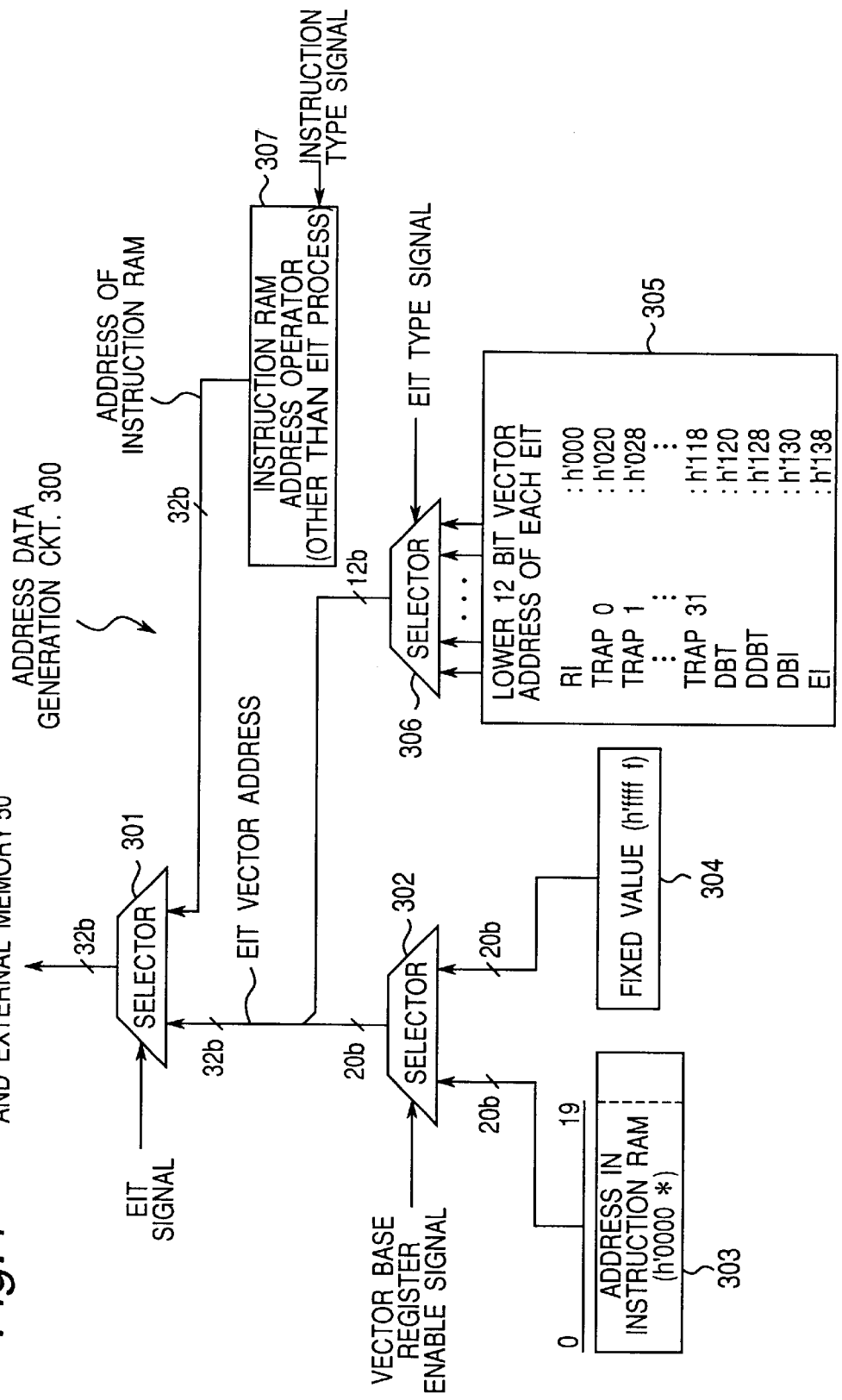
FIG. 4 shows the configuration of an address generating circuit in the microprocessor shown in FIG. 1.

FIG. 4 is a block diagram of the address data generator 300 in the memory controller 14.

A selector 302 has two 20-bit data input terminals, and is connected by way of a 20-bit wide data bus to vector base register 303 and fixed address register 304.

The vector base register 303 stores the upper 20 bits **0000*h** of the starting address of the EIT vector area copied to instruction RAM 6. The fixed address register 304 stores the upper 20 bits fffffh of the starting address of the EIT vector area in external memory 50.

Based on the value of the vector base register enable signal, the selector 302 selects either vector base register 303 or fixed address register 304, and outputs the data stored to the selected register as the upper 20 bits of the 32-bit EIT vector address. As noted above, the vector base register enable signal is a single bit in control signal 11 output by the instruction decoding unit 2. It is set to 1 if the instruction is an EIT process, and is otherwise set to 0.

Register 305 comprises a plurality of registers for storing the lower 12 bits of the EIT process vector addresses. Selector 306 selects and outputs from register 305 lower 12 bits of the EIT vector address corresponding to the EIT process type specified by the EIT type signal.

Another selector 301 also has two 32-bit wide data input terminals. The upper 20-bit line of the 32-bit wide bus connected to a first input terminal is connected to a 20-bit wide bus from the selector 302, and the lower 12-bit line is connected to the 12-bit wide bus from the other selector 306. As a result, a 32-bit EIT vector address of which the upper 20 bits are output from one selector 302 and the lower 12 bits are output from another selector 306 is input to a first input terminal of selector 301.

The second 32-bit data input terminal of the selector 301 is connected via a 32-bit wide bus to the output terminal of instruction RAM address operator 307. The instruction RAM address operator 307 outputs a 32-bit address in instruction RAM 6 corresponding to the instruction to be executed based on the instruction type signal contained in control signal 11.

Based on the EIT signal, which is indicative of whether the instruction type is an EIT process, the selector 301 selects either the EIT vector address data input to the first input terminal, or the address data for instruction RAM 6 input to the second input terminal. It then passes the selected data to the 32-bit wide external bus 40 connected to the external memory 50 and to the IA bus 20 connected to instruction RAM 6.

Figure 5:
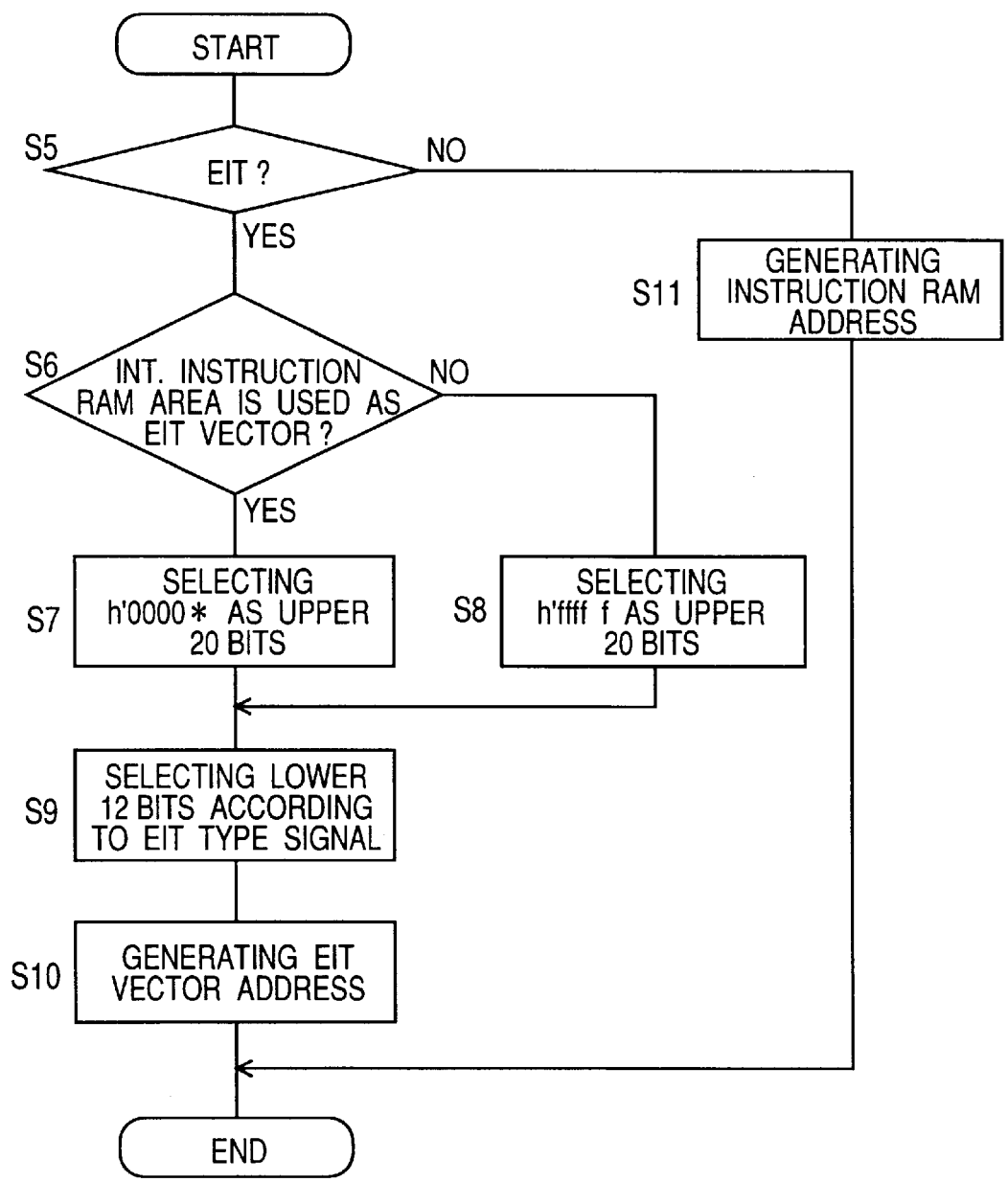
FIG. 5 is a flow chart of an address generating process in the microprocessor shown in FIG. 1.

FIG. 5 is a flow chart of the 32-bit address data generating process of the memory controller 14.

The first step (S5) when this process starts is determining whether the process is an EIT process. This is based on the EIT signal in control signal 11 output from instruction decoding unit 2. If the EIT signal is set to 1, that is, if the instruction to be executed is an EIT process, step S5 returns yes and it is determined whether to use the EIT vector area copied to instruction RAM 6. This determination is based on the vector base register enable signal in control signal 11 (S6). As noted above, the vector base register enable signal is set to 1 if the EIT process is a trap 0 to 31, EI, or other process not required for program development; if the EIT process is a RI or DBT DDBT, or DBI required for program development, the EIT signal is set to 0.

If the vector base register enable signal is set to 1, that is, the EIT process is a trap 0 to 31 or EI, the EIT vector area copied to instruction RAM 6 is to be used and step S6 returns yes. As a result, the upper 20 bits of the EIT vector address are obtained from the address data 0000*h stored to the vector base register 303 (S7).

However, if the vector base register enable signal is set to 0, that is, the EIT process is a RI or DBT, DDBT, or DBI, the address ffffh stored to the fixed address register 304 is used as the upper 20 bits of the EIT vector address (S8).

Selector 306 is then switched based on the EIT type signal indicating the type of EIT process to select the lower 12 bits of the EIT vector address for the corresponding EIT process (S9). The upper 20 bits of the EIT vector address obtained from either step S7 or S8, and the lower 12 bits of the EIT vector address selected in step S9, are then combined to generate the 32-bit EIT vector address (S10), and this process ends.

It is to be noted that if the EIT signal is 0 and step S5 thus determines that an instruction other than for an EIT process is to be executed (S5 returns no), the instruction RAM address operator 307 calculates the address in the instruction RAM 6 for the corresponding instruction (S11).

The above described method of the present invention makes it possible to move the destination of branches in a process sequence from the EIT process vector area stored in external memory 50 to the EIT vector area copied to high speed internal instruction RAM 6 when traps and other EIT processes not affecting the programming environment are executed. As a result, such EIT processes can be performed more quickly.

For EIT processes related to microprocessor resets and debugging required for program development, however, the destination of branches in a process sequence are fixed to the EIT vector area in external memory 50. As a result, crashing the programming environment as the result of a user unintentionally changing a branch destination can be prevented.

It is to be further noted that during EIT process execution, the instruction decoding unit 2 automatically determines based on the type of implemented EIT process whether the process sequence branches to the EIT vector area in external memory 50 or the EIT vector area copied to instruction RAM 6. As a result, a microprocessor 1 according to this preferred embodiment can prevent crashing the programming environment without making the programmer aware of whether debugging-related EIT processes are using the EIT vector area in external memory 50 or the EIT vector area copied to instruction RAM 6.

Embodiment 2

A microprocessor 1 according to the above described first preferred embodiment of the present invention copies data from the EIT vector area stored to external memory 50 directly to the instruction RAM 6. It is alternatively possible, however, with a microprocessor 100 according to a second preferred embodiment of the present invention to copy data from the EIT vector area in external memory 50 to first and second EIT vector areas in instruction RAM 6, and then selectively access these first and second EIT vector areas according to the type of EIT process being executed.

More specifically, a microprocessor 100 according to this second embodiment of the present invention copies data for EIT process programs related to debugging operations required for program development to a first EIT vector area, and copies data for other EIT process programs to a second EIT vector area. When an EIT process related to debugging operations required for program development is then run, the first EIT vector area is addressed by branches in the process sequence. When other EIT processes are executed, the second EIT vector area is addressed by branches in the process sequence.

Figure 7:
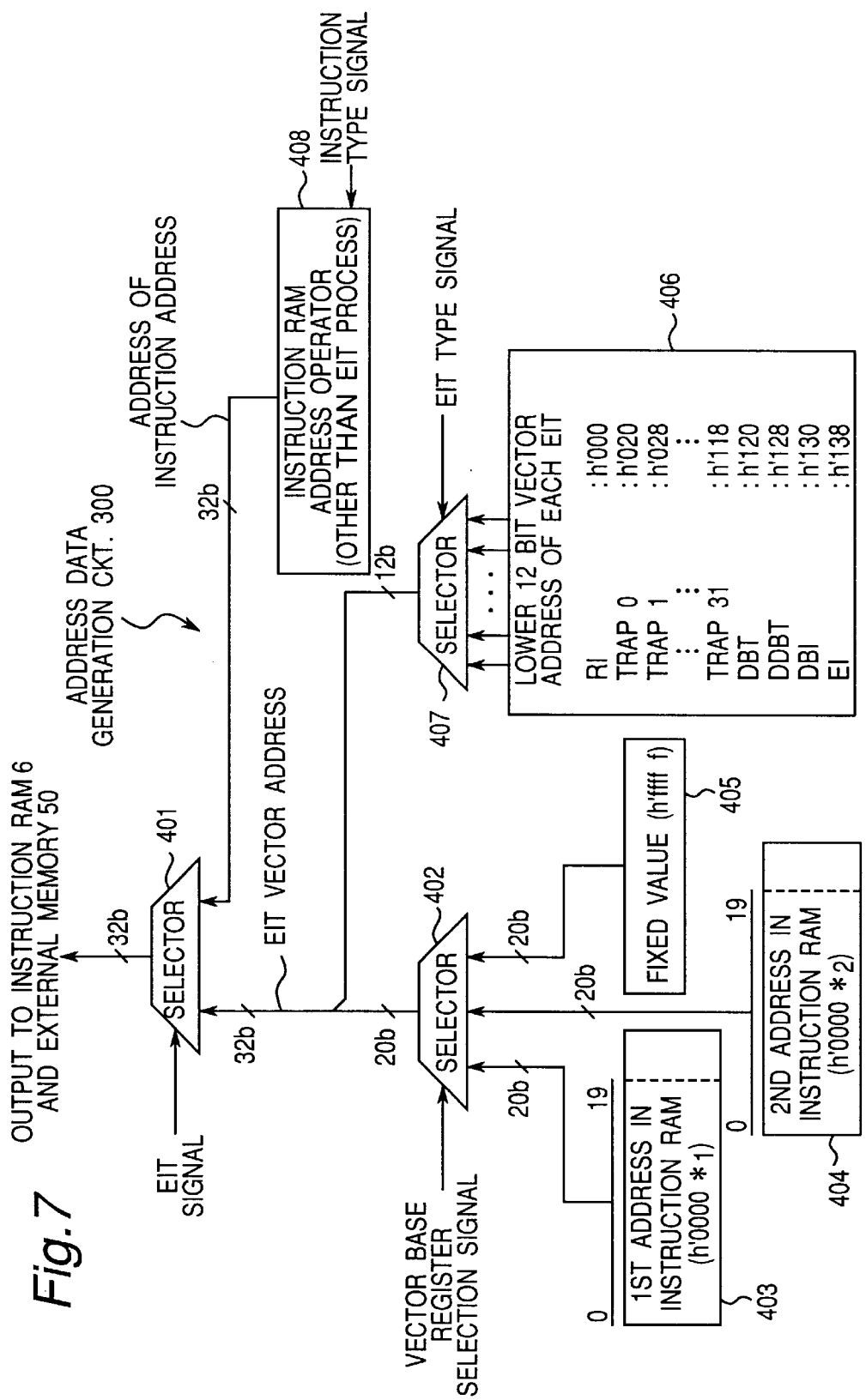
FIG. 7 shows the configuration of an address generating circuit according to a second preferred embodiment of the present invention.

A microprocessor 100 according to this second preferred embodiment of the invention is described next below. As shown in FIG. 7, the address data generator 400 of this microprocessor 100 is substantially identical to the address data generator 300 of a microprocessor 1 according to the above first embodiment. This address data generator 400 differs in that it comprises two vector base registers 403 and 404. Like parts in microprocessor 1 and microprocessor 100 are therefore referenced using the same reference numeral in the following description of microprocessor 100.

Accommodating these two vector base registers 403 and 404, the instruction decoding unit 2 outputs a 2-bit vector base register selection signal instead of a 1-bit vector base register enable signal. If the EIT process is a reset interrupt (RI) process, the vector base register selection signal is set to 00. If the EIT process is a DBT, DDBT, or DBI used for program development, the vector base register selection signal is set to 01. If the EIT process is a trap 0 to 31 or EI (exception interrupt) that is not used for program development, the vector base register selection signal is set to 10.

Figure 6:
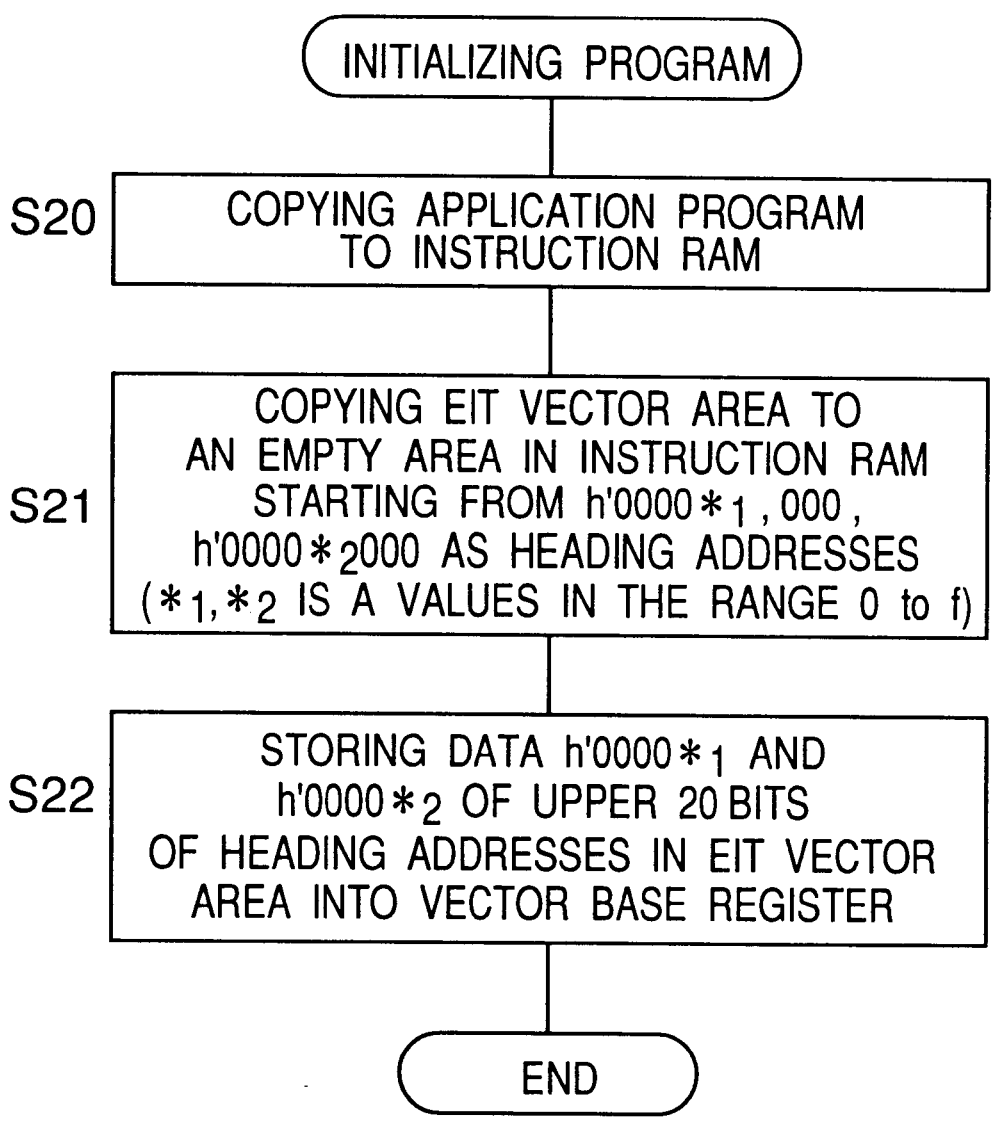
FIG. 6 is a flow chart of the initialization process in a microprocessor according to a second preferred embodiment of the present invention.

FIG. 6 is a flow chart of the initialization program run when the microprocessor 100 is activated or reset. At step S20, the application program is copied to instruction RAM 6. In this preferred embodiment, data from the EIT vector area in external memory 50 for EIT processes related to debugging operations required for program development is copied to a first EIT vector area in instruction RAM 6 starting from an empty address space at 0000$*_1$000h without changing the lower 12 bits of the address; data for EIT process programs not related to program development are copied to a second EIT vector area in instruction RAM 6 starting from an empty address space at 0000$*_2$000h, again without changing the lower 12 bits of the address (S21). It is to be noted that in this exemplary embodiment the values $*_1$ and $*_2$ address an empty area in instruction RAM 6. These values $*_1$ and $*_2$ can be any value in the range 0 to f (hexadecimal) and by way of example only are 7 and 8, respectively, in this embodiment. It is to be noted that insofar as the addressed area in instruction RAM 6 is empty, the value of * can be set by the user within the initialization program anywhere in the range 0 to f (hex).

It should be further noted that in step S21 all data in the EIT vector area stored to external memory 50 can also be copied to the first and second EIT vector areas starting from empty address space at 0000$*_1$000h and 0000$*_2$000h in instruction RAM 6.

The upper 20 bits 0000$*_1$h of starting address 0000$*_1$000h for the first EIT vector area are then stored to vector base register 403 (see FIG. 7), and the upper 20 bits 0000$*_2$h of starting address 0000$*_2$000h for the second EIT vector area are stored to vector base register 404 (S23).

FIG. 7 is a block diagram of the address data generator 400 contained in the memory controller (equivalent to memory controller 14 shown in FIG. 1) of the microprocessor 100 according to this preferred embodiment.

As shown in FIG. 7, selector 402 has three 20-bit data input terminals, and is connected by way of 20-bit wide bus to vector base registers 403 and 404 and fixed address register 405.

Vector base register 403 stores the upper 20 bits 0000$*_1$h of starting address 0000$*_1$000h for the first EIT vector area copied to instruction RAM 6. Vector base register 404 stores the upper 20 bits 0000$*_2$h of starting address 0000$*_2$000h for the second EIT vector area copied to instruction RAM 6. Fixed address register 405 stores the upper 20 bits fffffh of the starting address of the EIT vector area in external memory 50.

Based on the value of the vector base register selection signal, selector 402 selects one of the three registers 403, 404, and 405, and outputs the 20-bit address data stored to the selected register as the upper 20 bits of the 32-bit EIT vector address.

Register 406 comprises a plurality of registers for storing the lower 12 bits of the EIT process vector addresses. Selector 407 selects and outputs from register 406 the lower 12 bits of the EIT vector address corresponding to the EIT process type specified by the EIT type signal.

Selector 401 has two 32-bit wide data input terminals. The upper 20-bit line of the 32-bit wide bus connected to a first input terminal is connected to a 20-bit wide bus from selector 402, and the lower 12-bit line is connected to the 12-bit wide bus from selector 407. As a result, a 32-bit EIT vector address of which the upper 20 bits are output from one selector 402 and the lower 12 bits are output from another selector 407 is input to a first input terminal of selector 401.

The second 32-bit data input terminal of selector 401 is connected via a 32-bit wide bus to the output terminal of instruction RAM address operator 408. The instruction RAM address operator 408 outputs a 32-bit address in instruction RAM 6 corresponding to the instruction to be executed based on the instruction type signal contained in control signal 11.

Based on the EIT signal, which is indicative of whether the instruction type is an EIT process, selector 401 selects either the EIT vector address data input to the first input terminal, or the address data for instruction RAM 6 input to the second input terminal. It then passes the selected data to 32-bit wide external bus 40 connected to the external memory 50 and to IA bus 20 connected to instruction RAM 6.

Figure 8:
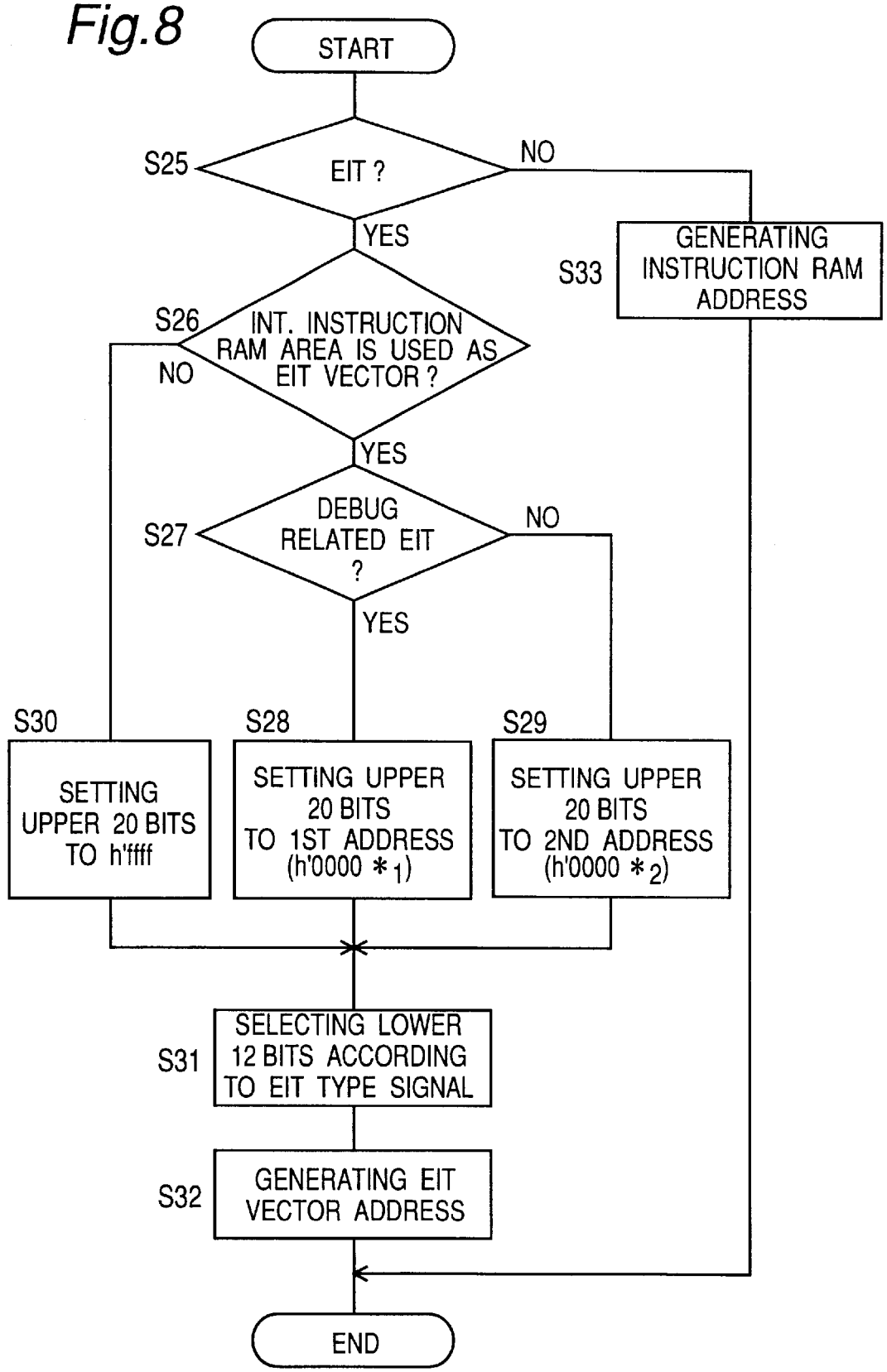
FIG. 8 is a flow chart of an address generating process according to a second preferred embodiment of the present invention.

FIG. 8 is a flow chart of the 32-bit address data generating process of the memory controller (corresponding to memory controller 14 in FIG. 1) in a microprocessor 100 according to this preferred embodiment.

The first step (S25) when this process starts is determining whether the process is an EIT process. This is based on the EIT signal in control signal 11 output from instruction decoding unit 2. If the EIT signal is set to 1, that is, if the instruction to be executed is an EIT process, step S25 returns yes and it is determined whether to use the EIT vector area stored in external memory 50, or the first or second EIT vector area copied to instruction RAM 6 (S26 and S27). This determination is based on the vector base register selection signal.

If the vector base register selection signal is set to 00, indicating the EIT process is a reset process (S26=no), the process sequence branches to EIT vector area in external memory 50. The upper 20 bits of the EIT vector address are therefore the address data fffffh stored to fixed address register 405 (S30).

If the vector base register selection signal is set to 01, indicating the EIT process is a DBT, DDBT, or DBI process required for program development (S26=yes and S27=yes), the process sequence branches to the first EIT vector area in instruction RAM 6. The upper 20 bits of the EIT vector address are therefore the address data 0000$*_1$h stored to vector base register 403 (S28).

If the vector base register selection signal is set to 10, indicating the EIT process is a trap 0 to 31 or EI process not required for program development (S26=yes and S27=no), the process sequence branches to the second EIT vector area in instruction RAM 6. The upper 20 bits of the EIT vector address are therefore the address data 0000$*_2$h stored to vector base register 404 (S29).

Based on the value of the EIT type signal indicating the type of EIT process, the lower 12 bits of the EIT vector address are selected from register 406 (S31). The upper 20 bits of the EIT vector address obtained from either step S28, S29, or S30, and the lower 12 bits of the EIT vector address selected in step S31, are then combined to generate the 32-bit EIT vector address (S32), and this process ends.

It is to be noted that if the EIT signal is 0 and step S25 thus determines that an instruction other than for an EIT process is to be executed (S25 returns no), the instruction RAM address operator 408 calculates the address in the instruction RAM 6 for the corresponding instruction (S33), and the process ends.

The above described method of the present invention makes it possible to fix the destination of branch sequences to the external memory 50 when executing a reset interrupt process; change the destination of branch sequences from the EIT vector area in external memory 50 to a first EIT vector area copied to internal instruction RAM 6 when DBT, DDBT, or DBI processes related to debugging operations required for program development are executed; and change the destination of branch sequences from the EIT vector area in external memory 50 to a second EIT vector area copied to internal instruction RAM 6 when traps 0 to 31 or exception interrupt processes are executed.

Compared with a microprocessor 1 according to the first embodiment of the present invention, a microprocessor 100 according to this second preferred embodiment can run EIT processes related to debugging operations required for program development more quickly.

Furthermore, by separating debugging related EIT processes from other EIT processes, crashing the program development environment as a result of a user inadvertently changing the address of debugging related EIT processes can be effectively prevented as in a microprocessor 1 according to the first embodiment described above.

It is to be further noted that during EIT process execution, the instruction decoding unit 2 automatically determines based on the type of implemented EIT process whether the process sequence branches to the EIT vector area in external memory 50 or the first or second EIT vector area copied to instruction RAM 6. As a result, a microprocessor 100 according to this preferred embodiment of the invention can prevent crashing the program development environment without making the program developer aware of whether debugging related EIT processes are using the EIT vector area in external memory 50 or an EIT vector area copied to instruction RAM 6.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A microprocessor having an exception, interrupt, and trap (EIT) processing function for branching a program processing sequence to an EIT vector area for executing an EIT process program when an EIT process is initiated, said microprocessor being connected to an external memory having an EIT vector area containing programs for a plurality of EIT processes, said microprocessor comprising:
    an internal memory for storing first data in a first area of the internal memory and second data in a second area of the internal memory, said first data being identical to data in a first portion of the EIT vector area of the external memory and said second data being identical to data in a second portion of the EIT vector area of the external memory;
    a determining circuit for determining whether an EIT process initiated during process sequence execution is a first EIT process, a second EIT process or a third EIT process among the plurality of EIT processes; and
    a branch destination changer for setting a process sequence branch destination to the EIT vector area stored in the external memory when the determining circuit determines the initiated EIT process to be the first EIT process, setting the process sequence branch destination to the first area of the internal memory when the determining circuit determines the initiated EIT process to be the second EIT process, and setting the process sequence branch destination to the second area of the internal memory when the determining circuit determines the initiated EIT process to be the third EIT process, wherein the branch destination changer includes:
        a first register for storing a first upper address specifying the first area of the internal memory;
        a second register for storing a second upper address specifying the second area of the internal memory;
        a first selector connected to the first and second registers, for selecting one of the first upper address, the second upper address and a third upper address specifying the external memory, the first selector outputting the third upper address when the determining circuit determines the initiated EIT process to be the first EIT process, outputting the first upper address when the determining circuit determines the initiated EIT process to be the second EIT process, and outputting the second upper address when the determining circuit determines the initiated EIT process to be the third EIT process;
        a plurality of registers for storing lower addresses respectively corresponding to the plurality of EIT processes; and
        a second selector for selecting the plurality of registers and output the lower address stored in the selected register, wherein
            the process sequence branch destination is specified by the upper address output from the first selector and the lower address output from the second selector.

2. A microprocessor having an exception, interrupt, and trap (EIT) processing function for branching a program processing sequence to an EIT vector area for executing an EIT process program when an EIT process is initiated, said microprocessor being connected to an external memory having an EIT vector area containing programs for a plurality of EIT processes, said microprocessor comprising:
    an internal memory for storing first data in a first area of the internal memory and second data in a second area of the internal memory, said first data being identical to data in a first portion of the EIT vector area of the external memory and said second data being identical to data in a second portion of the EIT vector area of the external memory;
    a determining circuit for determining whether an EIT process initiated during process sequence execution is a first EIT process, a second EIT process or a third EIT process among the plurality of EIT processes; and
    a branch destination changer for setting a process sequence branch destination to the EIT vector area stored in the external memory when the determining circuit determines the initiated EIT process to be the first EIT process, setting the process sequence branch destination to the first area of the internal memory when the determining circuit determines the initiated EIT process to be the second EIT process, and setting the process sequence branch destination to the second area of the internal memory when the determining circuit determines the initiated EIT process to be the third EIT process;
    wherein the branch destination changer includes:
        a first register for storing a first upper address specifying the first area of the internal memory;

a second register for storing a second upper address specifying the second area of the internal memory;

a first selector connected to the first and second registers, for selecting one of the first upper address, the second upper address and a third upper address specifying the external memory, the first selector outputting the third upper address when the determining circuit determines the initiated EIT process to be the first EIT process, outputting the first upper address when the determining circuit determines the initiated EIT process to be the second EIT process, and outputting the second upper address when the determining circuit determines the initiated EIT process to be the third EIT process;

a plurality of registers for storing lower addresses respectively corresponding to the plurality of EIT processes; and a second selector for selecting the plurality of registers and output the lower address stored in the selected register, wherein the process sequence branch destination is specified by the upper address output from the first selector and the lower address output from the second selector, wherein an initialization process is executed by an initialization program is executed when the microprocessor is activated and reset, the initialization process including a process of copying the first and second data into the internal memory, and a process of writing the first and second upper addresses into the first and second registers, respectively.

3. A microprocessor having an exception, interrupt, and trap (EIT) processing function for branching a program processing sequence to an EIT vector area for executing an EIT process program when an EIT process is initiated, said microprocessor being connected to an external memory having an EIT vector area containing data for various EIT process programs, including an EIT process Program related to program development, and comprising:

an internal memory for storing data identical to the data in the EIT vector area of the external memory;

a determining circuit for determining whether an EIT process initiated during process sequence execution is an EIT process required for program development;

a branch destination changer for setting a process sequence branch destination to the EIT vector area stored in the external memory when the determining circuit determines the initiated EIT process to be the EIT process required for program development, and setting the process sequence branch destination to the EIT vector area stored in the internal memory when the determining circuit determines the initiated EIT process to not be the EIT process required for program development;

a register for storing a first upper address specifying the storage area of said internal memory;

a first selector connected to said register and receiving a second address specifying a storage area of the external memory, said first selector selectively outputting the first and second addresses according to a determination result by said determining circuit;

a plurality of registers for storing addresses respectively corresponding to the EIT process program; and a second selector selectively outputting the addresses stored in said plurality of registers;

wherein the process sequence branch destination is specified by both of the addresses output from said first and second selectors.

* * * * *